US009715237B2

(12) United States Patent
Schick et al.

(10) Patent No.: US 9,715,237 B2
(45) Date of Patent: Jul. 25, 2017

(54) FLOW-CONTROL VALVE SYSTEM AND METHOD (71) Applicant: Spraying Systems Co., Wheaton, IL (US)

(72) Inventors: Rudolf J. Schick, Forest Park, IL (US); Fadi Alameddine, Dubai (AE)

(73) Assignee: Spraying Systems Co., Wheaton, IL (US)

( * ) Notice: Subject to any disclaimer, the term of this patent is extended or adjusted under 35 U.S.C. 154(b) by 518 days.

(21) Appl. No.: 14/468,585

(22) Filed: Aug. 26, 2014

(65) Prior Publication Data

US 2015/0057816 A1 Feb. 26, 2015

Related U.S. Application Data (60) Provisional application No. 61/870,049, filed on Aug. 26, 2013.

(51) Int. Cl.
*G05D 7/06* (2006.01)
*G05D 23/19* (2006.01)
*G01F 1/36* (2006.01)
*G01F 15/00* (2006.01)

(52) U.S. Cl.
CPC ....... *G05D 7/0635* (2013.01); *G05D 23/1919* (2013.01); *G01F 1/36* (2013.01); *G01F 15/005* (2013.01)

(58) Field of Classification Search
None
See application file for complete search history.

(56) References Cited

U.S. PATENT DOCUMENTS

| 3,687,158 | A | 8/1972 | Layton |
| 4,420,811 | A | 12/1983 | Tarnay et al. |
| 5,170,361 | A | 12/1992 | Reed |
| 5,294,045 | A | 3/1994 | Harris |
| 6,192,299 | B1 | 2/2001 | Kubota et al. |
| 6,827,100 | B1 | 12/2004 | Carlson |
| 2002/0145124 | A1 | 10/2002 | Kabasin et al. |
| 2006/0257581 | A1 | 11/2006 | Wulteputte |
| 2007/0246102 | A1* | 10/2007 | McDonald ........... G05D 7/0635 137/487.5 |
| 2007/0256739 | A1* | 11/2007 | Passos .................... F23N 1/002 137/486 |

(Continued)

FOREIGN PATENT DOCUMENTS

EP 0 540 079 A1 5/1993

OTHER PUBLICATIONS

United States Patent and Trademark Office, International Search Report in International Patent Application No. PCT/US2014/052651 (Dec. 18, 2014).

*Primary Examiner* — Tuan Dao
(74) *Attorney, Agent, or Firm* — Leydig, Voit & Mayer, Ltd.

(57) ABSTRACT

The disclosure describes a method for operating a flow-control valve that includes comparing a desired flow with an actual flow through the valve and re-calibrating a valve iso-curve at periodic intervals when the actual flow falls outside of a predetermined threshold relative to the desired flow. When operating in a nested control loop based on a control parameter, a flow setpoint is selected based on the control parameter and maintained independently of pressure across the flow-control valve.

20 Claims, 9 Drawing Sheets

(56) References Cited

U.S. PATENT DOCUMENTS

| | | |
|---|---|---|
| 2009/0125154 A1 | 5/2009 | Yli-Koski |
| 2013/0068313 A1 | 3/2013 | George et al. |
| 2013/0240045 A1 | 9/2013 | Feng |
| 2014/0097367 A1* | 4/2014 | Burt .................... F24D 19/1015 251/129.04 |

* cited by examiner

FLOW-CONTROL VALVE SYSTEM AND METHOD

CROSS-REFERENCE TO RELATED APPLICATIONS

This application claims priority to U.S. Provisional Patent Application Ser. No. 61/870,049, filed on Aug. 26, 2013, which is incorporated herein in its entirety by this reference.

TECHNICAL FIELD

This patent disclosure relates generally to fluid control devices and, more particularly, to fluid valves.

BACKGROUND

Pressure-independent control valves, which are commonly referred to by the acronym "PICV," are a type of control valve for controlling the flow rate of a fluid passing through a conduit. PICVs typically use two fluid flow control elements disposed in series. The first control element can control a pressure difference across the second control element, which controls the flow of fluid at the controlled pressure difference. In conventional applications, a hydraulically operated differential pressure control element is used in conjunction with an electrically actuated flow control valve element. The control valve element can respond to a command signal from a controller, while the hydraulically operated differential pressure control element adjusts the pressure difference across the control valve element.

For stabilizing the differential pressure across the control valve element, the hydraulically operated differential pressure control element is configured to adjust its flow resistance dynamically in response to pressure fluctuations in the system. In this way, the pressure difference is dynamically maintained constant to offset changes in flow, which are driven by system pressure fluctuations. The result of the controlled pressure difference across the control valve element means that a predictable and repeatable flow through the control valve element will correspond to each valve position of the control valve element.

PICVs are widely used in various fluid systems such as closed circuit high flow networks used, for example, in district cooling and heating networks. Advantages of PICV systems include high flow accuracy that is independent of system pressure fluctuations. High flow accuracy, in turn, permits satisfactory network loop fluid balancing and control stability. However, PICV systems also have disadvantages. For example, by using two control elements, a higher pressure drop across the system is inherently induced, which tends to increase pumping pressure for compensating the higher pressure loss. Moreover, the response time for PICV systems can be sluggish, especially due to hydro-mechanical controlling elements used to control the hydraulic pressure difference control element. Further, the operating range of the system in terms of flow and pressure fluctuation capability can be limited.

BRIEF SUMMARY OF THE DISCLOSURE

In one aspect, the present disclosure describes a method for operating a flow-control valve within a fluid system. The method includes computing a plurality of iso-curves in non-transitory computer media associated with an electronic controller. Each of the plurality of the original iso-curves contains information correlating a valve position with a flow through the flow-control valve and mapping it into a unique iso-curve based on a valve design parameter that is input by the operator. The method further includes translating an external control signal provided to the electronic controller to a desired flow rate based on the original iso-curve, automatically establishing a flow rate set point based on any desired variable such as temperature for example. Once any given control variable is translated into flow rate, the controller re-maps the external control signal output over a control output span, e.g. [4 mA-20 mA], and sends a signal to the flow-control valve to effect a change in its position in order to achieve the flow rate setpoint. Hence a unique flow rate for every valve position which meets the set point of the external controller is generated and achieved independently of changes in pressure across the flow-control valve. The flow through the flow control valve, and the external control signal are monitored, and the command signal is adjusted, in real time, as necessary, based on the original iso-curve, to preserve the flow characteristic inherent to the control valve. The original iso-curve is re-calibrated at periodic intervals by replacing the original iso-curve with an updated iso-curve belonging to a same family with the original iso-curve. The re-calibration is carried out when a then-present actual flow through the flow-control valve falls outside of a predetermined threshold relative to the desired flow indicating a severe disturbance in the process. The re-calibration is performed by the electronic controller based on a valve flow coefficient and other constants, which are determined in the electronic controller based at least in part on a valve flow signal indicative of the then-present actual flow through the flow-control valve that is received by the electronic controller.

In another aspect, the disclosure describes a method for controlling a flow of fluid through a pipe using an electronic controller and a valve responsive to a command signal from the electronic controller. The method includes receiving a desired valve position command signal at the electronic controller, the desired position command signal being indicative of a desired set point based on a control variable of the fluid within the pipe. The method further includes receiving a desired flow command signal at the electronic controller, the desired flow command signal being indicative of a desired flow rate of the fluid within the pipe and provided by a central controller, and determining a desired valve opening position of the valve in the electronic controller based on the desired flow command signal using an original iso-curve correlating valve opening to valve flow parameters. A valve command signal is generated based on the desired valve opening position when the desired valve opening position is less or equal to the maximum desired valve opening position. The electronic controller then sends the command signal to the valve to effect an opening of the valve to the desired valve opening position. The method further includes acquiring a signal indicative of actual flow through the valve with the electronic controller using a fluid flow sensor associated with the pipe and configured to provide a flow signal to the electronic controller, and comparing the actual valve flow through the valve with the desired flow rate based on the flow signal and, when a difference between the actual valve flow and the desired flow rate exceeds a threshold, calculating a new iso-curve for the valve, storing the new iso-curve in the electronic controller to replace the original iso-curve, and using the new iso-curve to determine future values for the desired valve opening position. In accordance with the method, calculating the new iso-curve is performed by the electronic controller based on a valve flow coefficient, which is determined in the electronic controller based at least in part on the flow signal.

In yet another aspect, the disclosure describes a method for controlling a temperature of a flow of a mixture of fluids at different temperatures in a pipe. The method includes receiving a desired temperature command signal and a current fluid temperature of the fluid mixture flowing in the pipe in an electronic controller. A desired flow rate for a first fluid of the fluid mixture is captured as a setpoint and, when a command signal change is received at the electronic controller, a new valve flow calibration is determined. The new valve flow calibration represents a valve flow controlling the flow of the first fluid versus a valve position transfer function. The method further includes determining a new flow setpoint for the first fluid based on the command signal change, comparing the new flow setpoint to a maximum flow rate, and changing a flow rate command to the valve for the first fluid based on the new flow setpoint. In accordance with the method, the new valve flow calibration is related to a previous command in the electronic controller in accordance with the following expression:

$$(Q'\_Req)=(Q\_Req)*((f(x2)-f(x1)*kCv)/f(x1)*kCv$$

where k is a positive constant, Cv is a valve flow coefficient, $f(x)=R^{\wedge}(x-1)$, and $x \in [0; 1]$.

DETAILED DESCRIPTION

This disclosure relates to flow control in fluid systems and, more particularly, to a flow control system that can selectively control the flow of fluid through a conduit irrespective of system pressure fluctuations and particular flow characteristics of the system. In one disclosed embodiment, a flow metering control valve (FMCV) system is disclosed. The FMCV operates as a fluid control valve that is pressure-independent and that uses electronic software control algorithms to model the behavior of a conventional mechanical pressure-independent control valve (PICV) in a system. By using electronic controls operating a valve based on a flow model, the FMCV is advantageously fully customizable to each application, flexible in its operation, and responsive to rapidly changing flow commands. Moreover, certain described FMCV embodiments are configured to provide feedback and system operating information such as flow saturation, in real time, which enables quick system response and control stability. In one disclosed embodiment, the PICV portion of the system is used to control the flow through the valve, where the flow through the valve directly affects another system parameter such as temperature. Because temperature readings can have long response times, when a desired temperature is present, the flow through the valve that results in the desired temperature is considered to be a setpoint for the system, essentially translating a temperature setpoint to a flow setpoint through the valve. In this way, quick and accurate control of the valve in terms of flow can be carried out independently of pressure across the valve along a single iso-curve while the temperature setpoint is maintained. If the valve exceeds a maximum allowable flow during this time, or valve position saturates either at maximum or minimum flow conditions, the system is reset and a new iso-curve is selected.

In one particular embodiment, the FMCV uses a flow correction mechanism embodied in executable, non-transitory computer means. The flow correction mechanism operates to override predetermined valve-flow curves for a given electromechanically operated valve, and re-map valve flow rate with respect to valve opening in accordance with a determined, reconstructed, and optimized flow curve. In other words, the system is configured to tailor the commands for a particular valve based on the system into which the valve is installed. This is accomplished by determining a new flow curve of valve opening with respect to flow through the valve in the particular system, which renders pressure control across the valve, as is required in traditional PICV systems, unnecessary and obsolete. Additionally, operation in a closed-loop control arrangement enables the FMCV to dynamically react and adapt to system variances and provide stable, accurate and repeatable performance.

Figure 1:
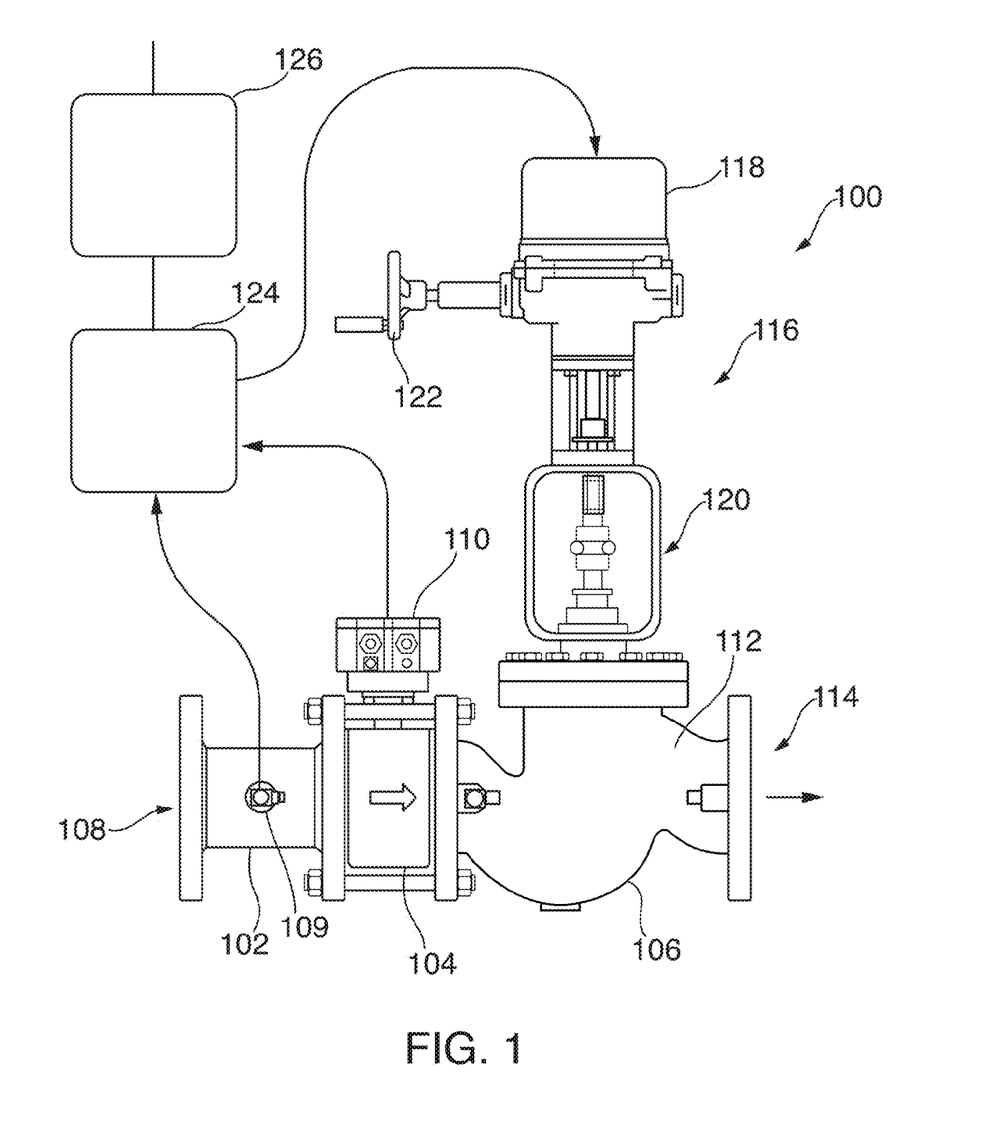
FIG. 1 is a schematic view of a flow metering control valve system in accordance with the disclosure.

One embodiment for a flow metering control valve (FMCV) system 100 is shown in FIG. 1. In the illustrated embodiment, the FMCV 100 includes a flow straightening device 102, a flow measuring device 104, and a controllable valve 106. In the illustrated embodiment, a temperature sensor 109 is disposed to measure a temperature of fluid passing through the flow straightening device 102. The flow straightening device 102 may be any type of flow straightener known in the art of fluid conveyance. In the illustrated embodiment, the flow straightening device 102 includes an outer conduit surrounding an inner flow conduit that is connected concentrically relative to the outer conduit by baffles extending radially therebetween at regular intervals. The function of the flow straightening device 102 is to reduce or remove turbulence of flow momentum imbalances present in a fluid flow that enters the system 100 through an inlet portion or opening 108. Such turbulence or flow imbalance may be created upstream of the system 100 due to merging of fluid flows at different speeds or temperatures, curves or other elbows in the piping, flow orifices or other flow control features of the piping upstream of the system 100 and/or other factors.

The flow measuring device 104 is a device that can monitor a mass or volume flow rate of fluid passing therethrough, and provide a flow signal indicative of the measured mass or flow rate to a controller. In the illustrated embodiment, the flow measuring device 104 is a device using a venturi-type internal arrangement that can estimate flow rate of fluid passing therethrough based on a pressure difference that is created between flow openings having different cross section. For example, a converging/diverging type flow orifice can be used where fluid pressure is measured at a minimum cross sectional area thereof and compared to the pressure at another location. An electronic differential pressure sensor 110 measures the pressure differential and provides a signal indicative of the pressure differential to a controller. It should be appreciated that other sensor types, at other locations, can be used to determine fluid flow through the valve. For example, a pressure difference across the valve can be used.

The controllable valve 106 includes a housing 112 that forms a metered fluid outlet opening 114. During operation, fluid may enter the inlet opening 108, pass through the fluid straightening device 102 and fluid measuring device 104, and then enter into the housing 112. The housing 112 may include a controllable valve element (not shown) disposed to selectively fluidly block fluid flow through the housing 112 depending on the position of the valve element within the housing 112. To determine the flow through the valve, in one embodiment, a pressure difference across the valve, for example, across the housing 112, can be used. The position of the valve element is controlled by an electromechanical controller 116 that includes a motor 118 operating a mechanical connection 120 between a motor outlet shaft and the valve element such that rotation of the motor in either of two directions operates to move the valve element in a respective direction which, in turn, operates to increase or decrease the fluid blockage within the housing 112. Operation of the motor 118 may be in response to a valve command signal provided in electronic form including digital and/or analog signals from a controller. In the illustrated embodiment, the controllable valve 106 also includes a manual override handle 122. Depending on the position of the valve element within the housing 112, a metered or controlled flow of fluid exits the system 100 through the outlet opening 114.

The system 100 further includes an electrical board 124 operably connected to a controller 126. The electrical board 124, which may operate as an input/output (I/O) board that includes digital to/from analog signal conversion capabilities, is connected with various components of the system 100 configured to provide information indicative of system operating parameters such as the temperature sensor 109 and the differential pressure sensor 110. The electrical board 124 is further connected with various system components configured to alter the operating condition of the valve 106 such as the motor 118. In alternative embodiments, the electrical board 124 may further receive information from a valve position sensor (not shown) disposed to measure a position of the valve element within the housing 112 as previously described. In the illustrated embodiment, the motor 118 is a stepper motor having integrated position feedback capability such that a predetermined valve position may be determined or otherwise estimated based on the valve command signal without the need for a position sensor providing an actual valve position, although use of a position sensor is also contemplated.

Figure 2:
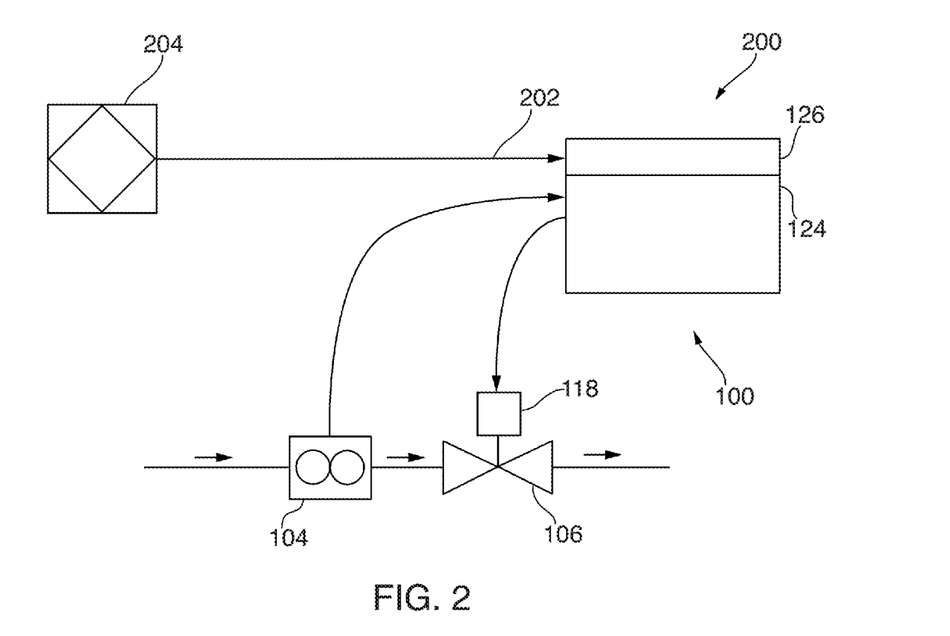
FIG. 2 is a block diagram for a flow control system in accordance with the disclosure.

A schematic diagram of one embodiment of the system 100 in use in an application is shown in FIG. 2. In this and in other embodiments, elements and features of the system that are the same or similar to corresponding elements and features previously described are denoted by the same reference numerals and referred to using the same names as previously used for simplicity. Accordingly, in the embodiment shown in FIG. 2, the electronic board 124 and controller 126 have been integrated into a single drive unit 200, which receives information and provides commands to/from various active system components such as the motor 118 and also from passive components such as the flow sensor 104. The single drive unit 200 is disposed to receive an external command signal 202 from a central controller 204, which may oversee operation of an entire fluid control network. In other words, the system 200 is advantageously configured to be self-sufficient in terms of its function and operation as a flow control device associated with a larger fluid network. In such an application, the system 100, via the single drive unit 200, may be configured to receive a desired flow command provided by the central controller 204, and adjust its operation to achieve the flow commanded while, optionally, providing a confirmation and/or flow feedback to the central controller 204. In one operating mode, the flow measuring device 104 may provide flow information that is used both as a control feedback when adjusting the position of the valve 106 as well as a feedback to the central controller 204.

Figure 3:
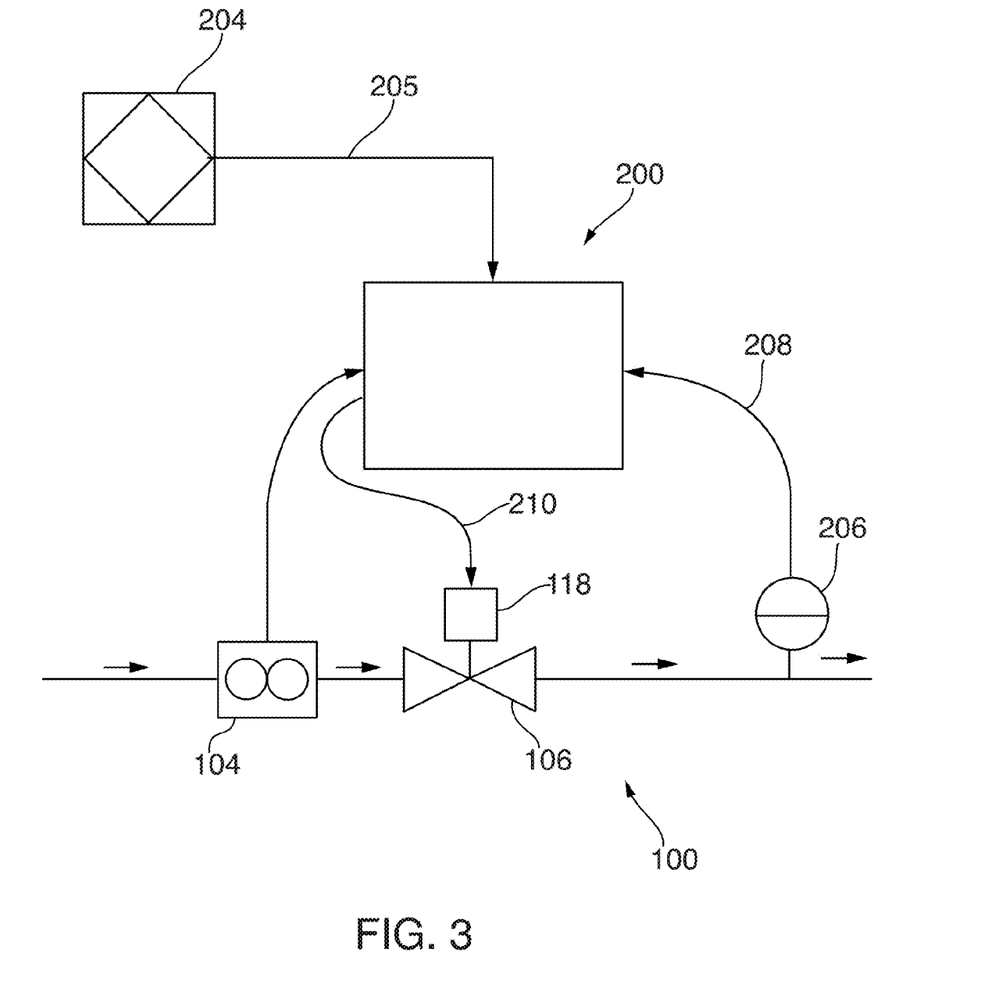
FIG. 3 is a block diagram for a temperature control system in accordance with the disclosure.

In certain applications, for example, in heating or cooling applications, it may be desired to achieve a desired fluid temperature at a point in the fluid network that is downstream of the flow metering control system 100, which is achieved by appropriately controlling the flow of fluid through the system 100 at a given temperature. A schematic of such an embodiment is shown in FIG. 3. In this embodiment, where like elements are denoted with the same reference numerals as previously used, a temperature setpoint 205 is provided to the drive unit 200. The drive unit may then adjust the position of the valve 106 based on the fluid flow therethrough but also based on a temperature of the fluid downstream of the system 100 as measured by a temperature sensor 206 that is operably connected to the drive unit 200. This is done in a nested control loop arrangement in which the temperature setpoint is translated into a flow setpoint through the valve, which flow setpoint is then used to control the valve, independently of pressure, while the temperature setpoint remains unchanged. When the temperature setpoint changes, or when the valve saturates or a maximum flow is present through the valve, the iso-curve along which the valve is controlled changes or is recalibrated.

More specifically, when the system operates in the temperature control loop configuration shown in FIG. 3, two nested control algorithms may be used. In a first control loop, the temperature setpoint 205 may be compared with a temperature reading 208 provided by the sensor 206 in a closed loop control scheme, for example, a proportional, integral and proportional (PID) controller to yield a desired valve command signal 210. At the same time, a second control loop may operate as previously described around the first control loop to ensure that system variations will not affect system performance. In this way, a flow reading captured by the flow measuring device 104 at the valve command signal that achieves the desired temperature downstream of the system is recorded and set as a flow setpoint while the temperature setpoint remains unchanged. Thereafter, the system may control the valve command signal based on the flow reading to maintain the desired flow setpoint until the temperature setpoint changes.

Figure 4:
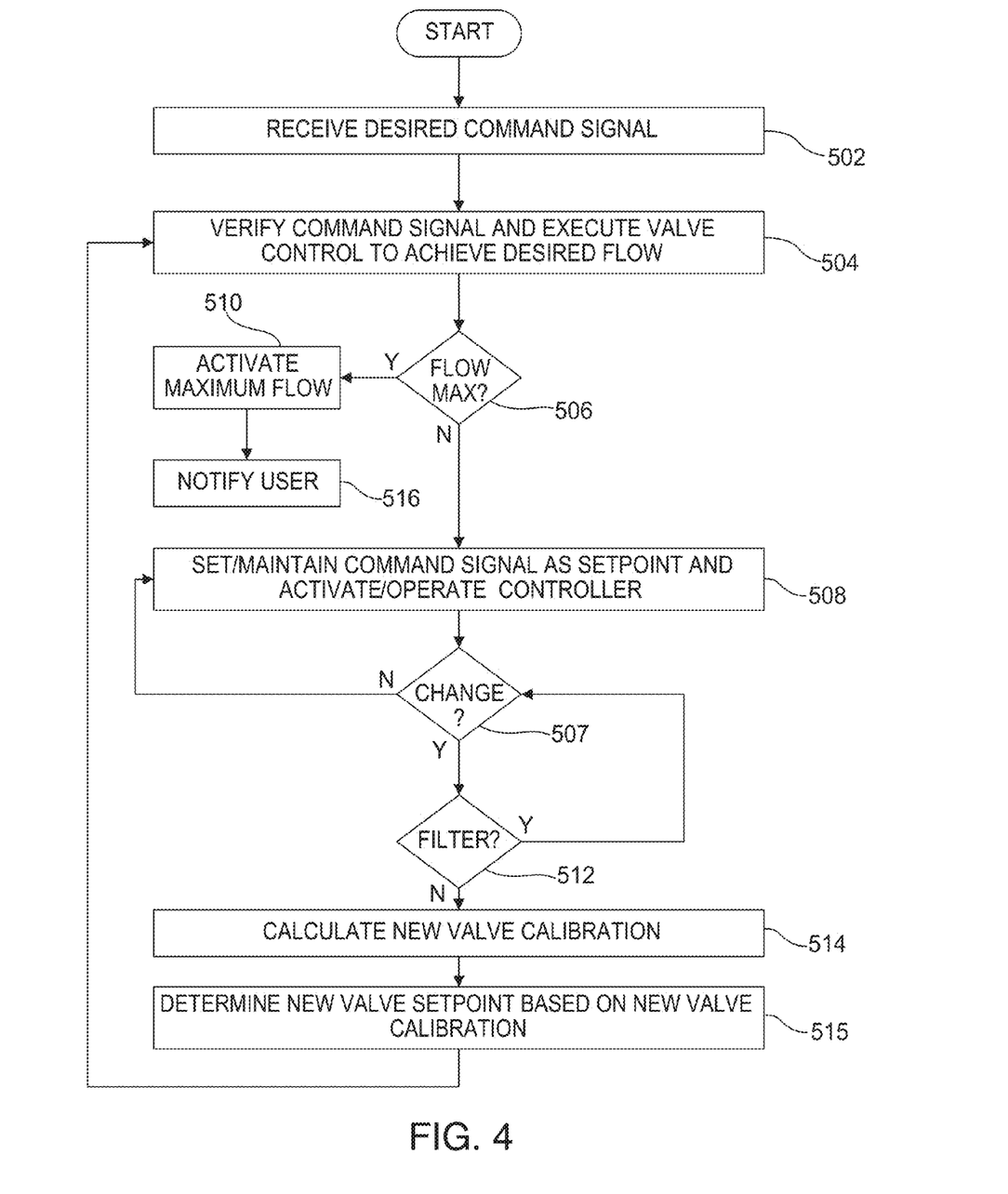
FIG. 4 is a flowchart for a method of metering flow in a system in accordance with the disclosure.

A flowchart for a method of operating the system 100 (FIG. 1) as a pressure-independent control valve is shown in FIG. 4. The method includes receiving a desired command signal at 502, which desired command signal need not be flow based. This command signal can be received from an external, system controller, or may alternatively be resolved by the valve controller. The desired command signal is verified, for example, to establish that it lies within an acceptable range, and a control is executed at 504 based on the command signal that results in an adjustment in the position of a valve of the system that corresponds to a flow through the valve that substantially matches a commanded flow that, when present, results in a system parameter that corresponds to the desired command signal. The command signal is translated into a valve flow, which valve flow is executed based on the command signal. For example, the command signal may request an increase in temperature, which the controller will translate into an increase in flow, which is then controlled via changing valve position. A verification is made at 506 to determine whether the flow corresponding to the command signal is below a maximum value Qmax. When the command signal corresponds to a flow that is below the maximum value, the corresponding flow is set as the setpoint for the control system at 508 and a controller, for example, a PID controller, is activated. The setpoint for the control system may be the result of an external control loop that monitors and controls flow through the system that is indicative of a control signal from the valve. That control signal can be correlated into the iso-curve, instead of or in addition to a flow parameter, and serve as a basis for calculating or adjusting the iso-curve selection. When the command signal is equal or greater than the maximum value, then the maximum value is commanded at 510.

While the command signal has not changed at a determination 507, the process continues at 508. Command signal changes can come from different sources. For example, the command signal change may represent a flow rate change, when the setpoint is flow rate, or may alternatively represent an increase or decrease in flow, when the command signal is the output of an external control loop for the system. When a new command signal is received, a check is made as to whether the change is within a filter bandwidth at 512 and, when it is, no change action is taken. When the new command signal is greater than a filter bandwidth, a new valve flow calibration is calculated at 514.

When calculating the new flow calibration at 514, the system dynamically determines or re-calibrates a new iso-curve for controlling the valve based on the then-present flow of fluid through the valve, as indicated, for example, by a flow sensor. The so called iso-curve, which is meant to describe a curve that, when plotted on axes representing valve flow versus position, can be used by the system to estimate a valve opening that will yield a desired flow through the valve, is selected from a family of possible iso-curves based on the selection of a valve flow coefficient and other constants, which can be determined dynamically, empirically or computationally. In this way, a fluid flow across the valve can be expressed as $Q=Cv*f(x)*Sqrt(DP/SG)$, where Cv is the valve Flow Coefficient, $f(x)=R^{\wedge}(x-1)$; and $x \in [0; 1]$. Assuming an Equal Percentage Characteristic, DP is the Pressure Drop across the valve, and SG is the fluid specific gravity (Water=1). Under the assumption that DP is constant across the valve travel, which is an ideal situation, then flow through the valve Q can be expressed as $Q=k(Cv.f(x))$; where k is a positive constant. Thus, the % change in flow rate as a result of a change in a controller signal can be expressed as $((f(x2)-f(x1)*kCv)/f(x1)*kCv$, which means that the % Gain=$(f(x2)-f(x1))/f(x1)$.

By determining the various constants that enable selection of a new iso-curve, the new iso-curve can be used to control the valve following process step 514. Such control accounts for any particular requirements of the piping system into which the valve is installed including aging effects of the piping system, changing fluid parameters, and the like. In the illustrated embodiment, such calibration of the flow curve occurs at each system startup such that environmental and system aging effects are accounted for. Re-calibrations may also occur at times when the valve assumes fully open or closed positions, and in instances where maximum valve flow is commanded, to account for changing fluid and/or system effects. In alternative embodiments, the system may perform a re-calibration, i.e., a selection of a new flow curve, at regular intervals or at every command change that exceeds a certain predetermined absolute amount. Having determined the new valve flow calibration at 514, the process calculates a new valve setpoint at 515 using the new calibration, and the process repeats as before by controlling to the new flow rate at 508. The new valve position or setpoint is calculated to account for flow rate changes according to the iso-curve in use at the time of the calculation, or may alternatively reflect a new valve position that maintains a constant valve flow when the actual valve flow is observed to change but the output of a system control loop has remained the same. In the latter case, pressure changes in other portions of the system may cause a change in the pressure across the valve, which may affect valve position of a constant valve flow is to be maintained, as may often be the case.

Alternative embodiments may further refine the flow curve as presented herein to account for effects of fluid temperature, viscosity, purity, and so forth. In one alternative embodiment, the system is configured to provide a notification at 516 to alert the operator and/or the central controller providing the command signals that the maximum flow has been reached. The notification can be an audible or visible alert generated locally or remotely relative to the system, and in one embodiment includes generating a text message informing the user that a rate flow limitation is present.

Figure 5:
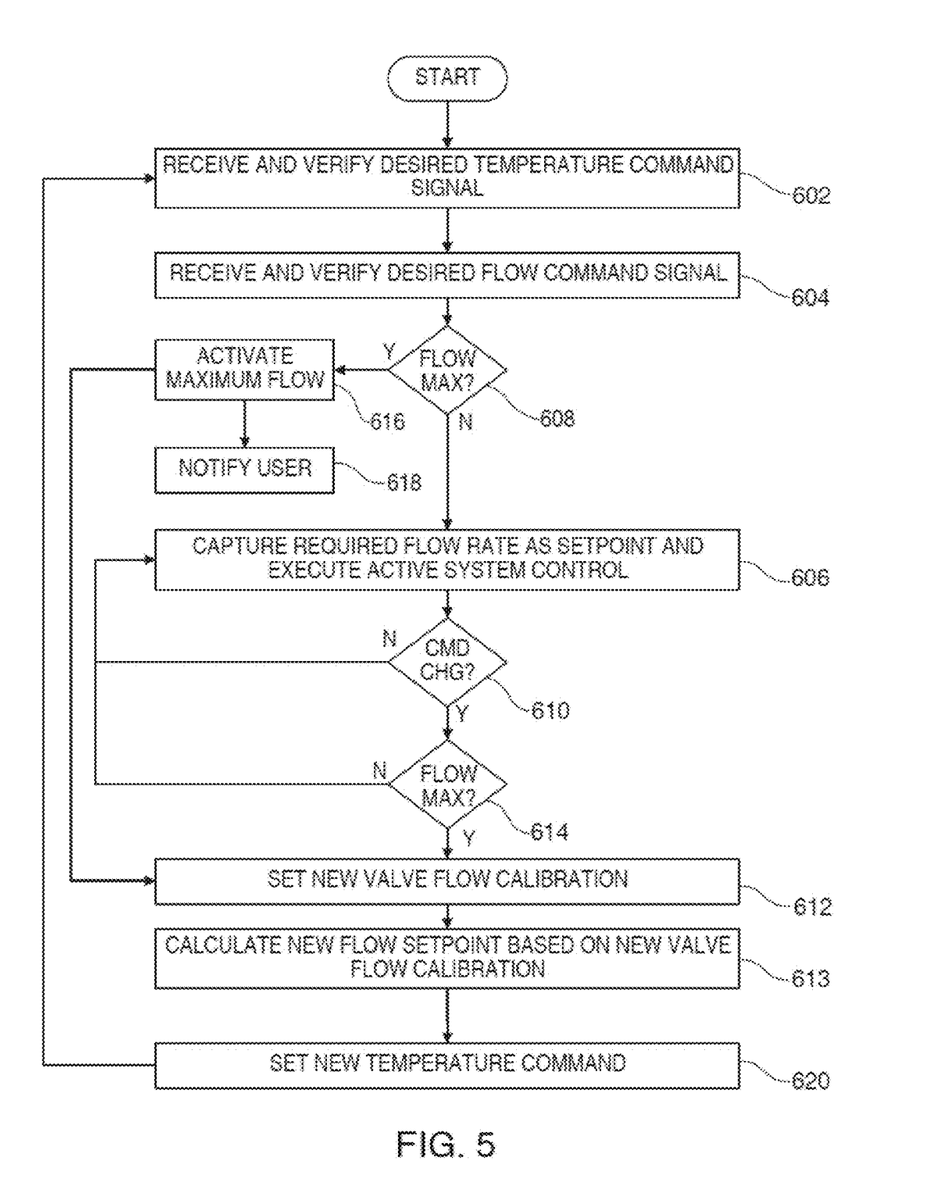
FIG. 5 is a flowchart for a method of controlling temperature in a fluid system in accordance with the disclosure.

A flowchart for a method of controlling temperature in a fluid system in accordance with the disclosure is shown in FIG. 5. The process may use temperature, flow meter and valve position sensor information indicative of the temperature of the flow out from the system, the rate of fluid flow through the system and the degree of valve opening, respectively. Control outputs of the system may include a valve command signal and a fluid flow rate as feedback to a central controller. In the illustrated embodiment, the control process begins with a verification of whether a current temperature of fluid flow out of the system is within a predetermined difference, for example, 3%, with respect to a desired or commanded value at 602. This determination can be made internally by the controller, or may be provided as a command signal from another controller managing a fluid system that communicates with the valve controller. A required parameter, which is translated into a desired flow rate, is received from the central controller at 604, and is captured as a useable setpoint at 606 when it is determined at 608 to be below a maximum flow rate value, which may be predetermined. The required flow rate can be captured as a derivative of a temperature signal.

When a command signal change is received at 610, a determination of whether a maximum valve flow will be required is repeated at 614. If no max flow is predicted, control continues at 606 with the iso-curve currently in use. However, if a maximum flow is required, a new valve flow calibration is determined and set at 612. Command signal changes can come from different sources. For example, the command signal change may represent a flow rate change, when the setpoint is flow rate, or may alternatively represent an increase or decrease in flow or temperature, when the command signal is the output of an external control loop for the system. The new calibration, which represents the valve flow versus valve position transfer function, is used to determine a new flow setpoint at 613. When the new setpoint is below the maximum, a new valve position or setpoint is calculated to account for flow rate changes according to the iso-curve in use at the time of the calculation, or may alternatively reflect a new valve position that maintains a constant valve flow when the actual valve flow is observed to change but the output of a system control loop has remained the same. In the latter case, pressure changes in other portions of the system may cause a change in the pressure across the valve, which may affect valve position of a constant valve flow is to be maintained, as may often be the case. The flow rate command as it relates to temperature is changed at 620, and the process optionally repeats. In one embodiment, the new valve flow calibration in terms of a flow command, (Q'_Req), is related to the previous command, (Q_Req), in accordance with the equation (Q'_Req)= (Q_Req)*((f(x2)−f(x1)*kCv)/f(x1)*kCv, where k is a positive constant, Cv is the valve Flow Coefficient, $f(x)=R^{(x-1)}$; and $x \in [0; 1]$. This equation represents a new flow curve for the valve, which is selected from a family of flow curves to reflect the particular flow curve that is suited for the system. When a flow curve is selected, the system assumes valve control using this flow curve to ensure accuracy, repeatability and suitability of the flow curve for the valve in the particular valve system in which the valve is installed. To select the curve, the system constants and, especially, the valve flow coefficient, are set to determine the particular flow curve that will be used for the system. In the illustrated embodiment, such calibration of the flow curve occurs at each system startup such that environmental and system aging effects are accounted for. In alternative embodiments, however, the system may perform a re-calibration, i.e., a selection of a new flow curve, at regular intervals or at every command change that exceeds a certain predetermined absolute amount. Alternative embodiments may further refine the flow curve as presented herein to account for effects of fluid temperature, viscosity, purity, and so forth. After the new setpoint is operational, the process repeats as necessary.

Figure 6:
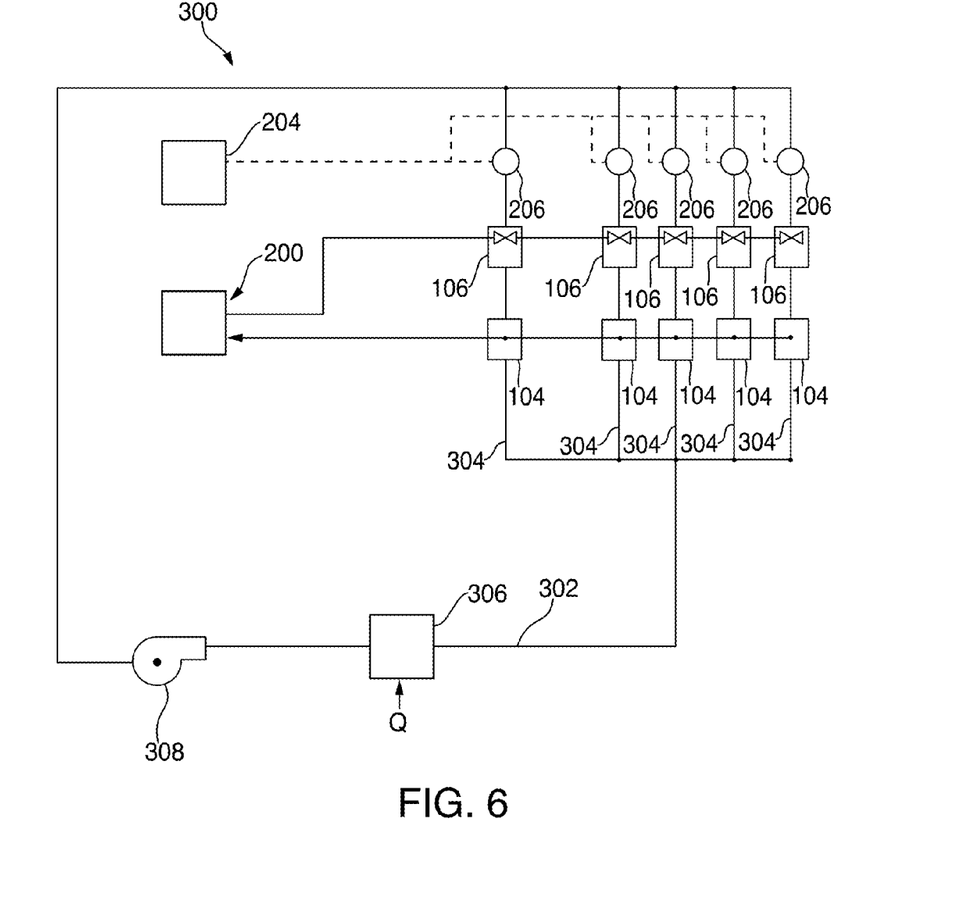
FIG. 6 is a schematic of a fluid network in accordance with the disclosure.

The systems and methods described herein are advantageously scaleable to manipulate an entire flow network 300 including one or more controllable fluid sites. A schematic of a network is shown in FIG. 6. In the illustrated embodiment, a main supply branch 302 of heated water is circulated between two or more circuits 304, for example, for heating various areas of a building or providing hot water on-demand to a facility such as a shower facility in a sports arena, hospital, hotel and others. The water is heated in a furnace 306 and circulated by a pump 308. The control unit 200 may be connected to each of a series of control valves 106, receive information for the flow and temperature through each branch 304, and effectively control the flow rate through each branch in response to a respective control signal received from the central controller 204 monitoring the temperature in the branches. In one embodiment, a second series of control valves can provide water at a second, cooler temperature, to each branch to increase the control range of the system.

It should be noted that the controller 126 (FIG. 1) can be a standalone controller or may alternatively be integrated with the central controller 204 (FIG. 2). Moreover, the controller may reside remotely from the system and communicate with a local controller via an Internet or other informational connection. The electronic controller 126 itself may be a single controller or may include more than one controller disposed to control various functions and/or features of the system 100. For example, a master controller, used to control the overall operation and function of the system may be cooperatively implemented with a plant controller used to control the network 300 (FIG. 6). In this embodiment, the term "controller" is meant to include one, two, or more controllers that may cooperate in controlling various functions and operations of a fluid system. The functionality of the controller, while shown and described conceptually in the above-described embodiments to include various discrete functions for illustrative purposes only, may be implemented in hardware and/or software without regard to the discrete functionality shown.

Figure 7:
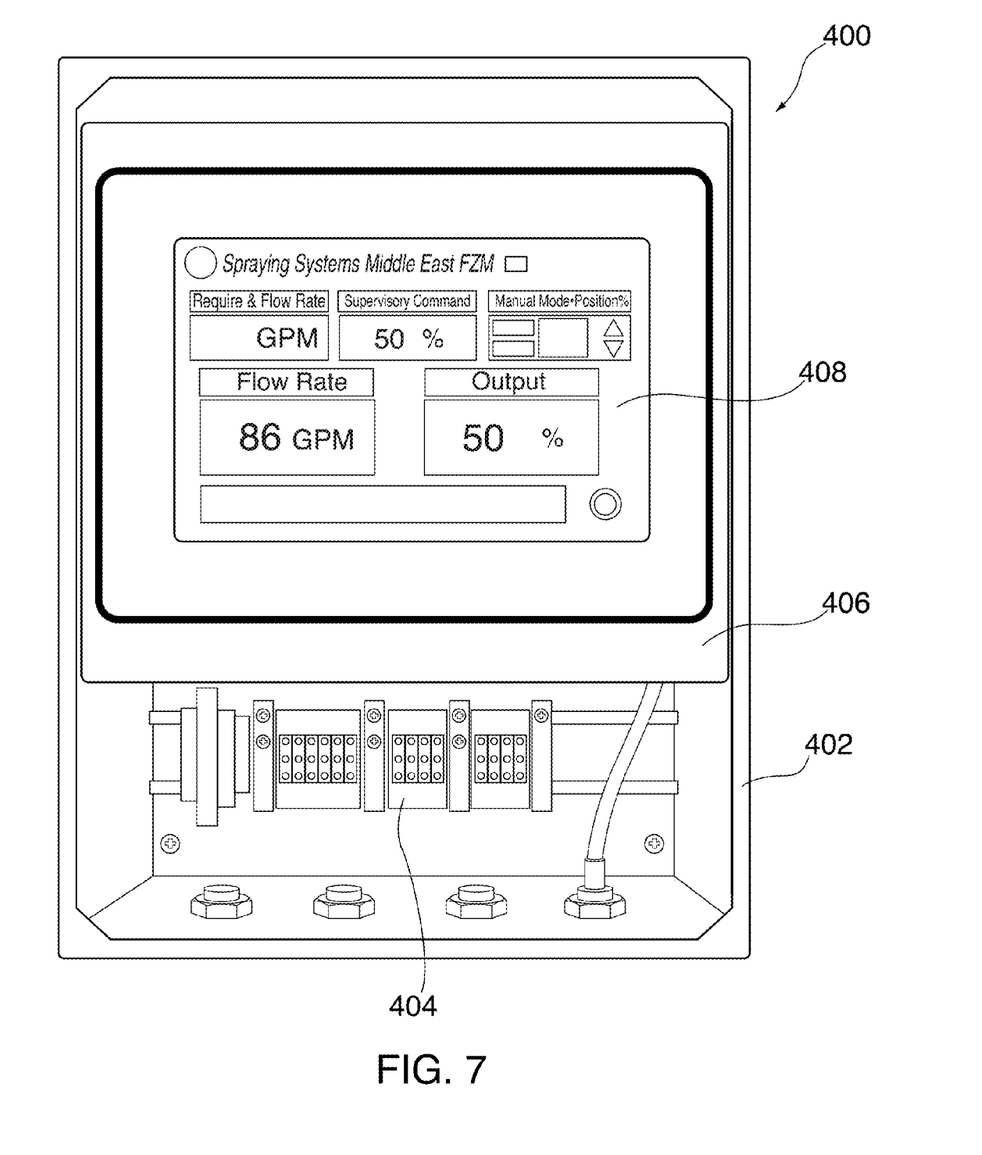
FIG. 7 is a diagram of a control panel in accordance with the disclosure.

In one embodiment, the controller 126 and electronics board 124 (FIG. 1) may be assembled in an integrated control panel 400, as shown in FIG. 7. The control panel 400 includes a cabinet 402 enclosing an electronics board 404 and a support platform 406 configured to mount a computer tablet 408 having a touch-screen interface. The computer tablet 408 of the illustrated embodiment is an industrial-grade Android® based tablet that interfaces with the electronics board 404 and that is configured to include and execute non-transitory, computer executable instructions for performing various control functions including standard PID functions. The cabinet 402 is an externally mounted NEMA 4x rated enclosure. The tablet 408 operates to present a user friendly and highly configurable 7" touch screen through which a user may monitor and control operation of the system. The control panel is directly linkable via wired or wireless means both to various systems sensors and actuators, including but not limited to fluid flow sensors, fluid pressure sensors, fluid temperature sensors and electric actuators for various types of control valves. The tablet 408 can also be pre-programmed with various different control algorithms to accommodate many applications along with an easy to use touch screen interface.

The electronics board 404 includes a range of different analog or digital I/O signal interfaces, and is arranged to exchange information with sensors and other controllers via various communication modes including Modbus, Ethernet, WIFI and other network recognitions.

The non-transitory computer information used to control the flow through the valve can also be modeled based on a valve position change that is correlated to a commanded flow setpoint change. Such information can be tabulated in the controller such that all operating points can be extrapolated therefrom. The values populating the tabulated data may be empirically determined during system calibration, which is process that can be repeated for each valve installation. One particular embodiment and its implementation in a pressure-independent flow control valve installation will now be discussed.

In this embodiment, a fluid flow across the valve can be expressed as Q=Cv*f(x)*Sqrt(DP/SG), where Cv is the valve Flow Coefficient, $f(x)=R^{(x-1)}$; and $x \in [0; 1]$. Assuming an Equal Percentage Characteristic, DP is the Pressure Drop across the valve, and SG is the fluid specific gravity (Water=1). Assuming that DP is constant across the valve travel, which is an ideal situation, then Q=k(Cv.f(x)); where k is a positive constant. Hence the % change in flow rate as a result of a change in a controller signal=((f(x2)−f(x1).kCv)/f(x1). kCv so % Gain=(f(x2)−f(x1))/f(x1)

Regarding valve modeling, a pressure drop from equipment and piping placed in series with the valve can be calculated or measured for given flow conditions such that various constants can be determined. Further, the total pressure drop and maximum flow through the valve can be determined and tabulated. One exemplary set of parameters for a given system are provided in the table below and are illustrated in the graphs shown in FIGS. 8 and 9. In Table 1, which corresponds to the graph in FIG. 8, an iso-curve representing the ideal flow characteristics of a linear flow valve is shown alongside an iso-curve representing the as-installed condition of the valve in a particular piping system.

TABLE 1

Calculate Pressure Drop from Equipment and Piping in Series with Valve

Figure 8:
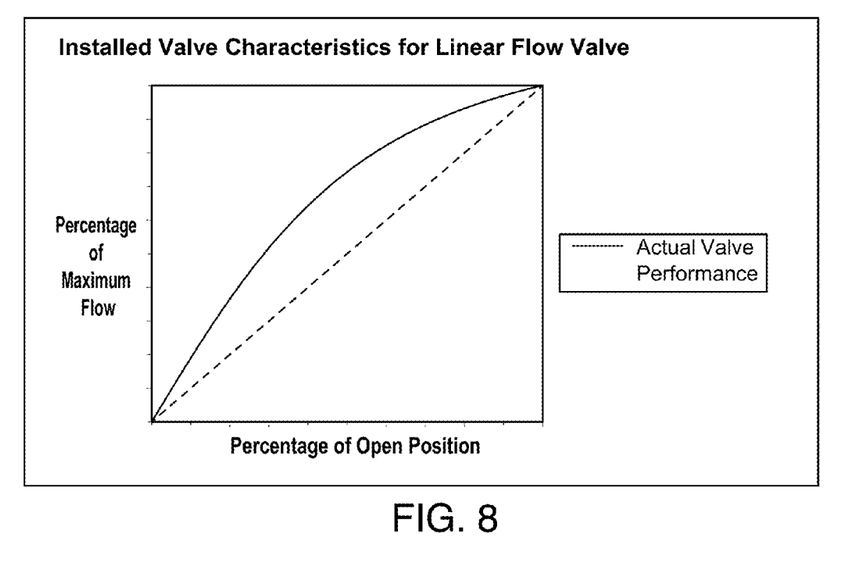
FIGS. 8 and 9 are charts illustrating valve performance in accordance with the disclosure.

| | |
|---|---|
| $K_{CL}$ | 0.003 |
| Sg | 1 |
| Flow (gpm) | 60 |
| $\Delta P_L$ (psi) | 10.8 |

Figure 9:
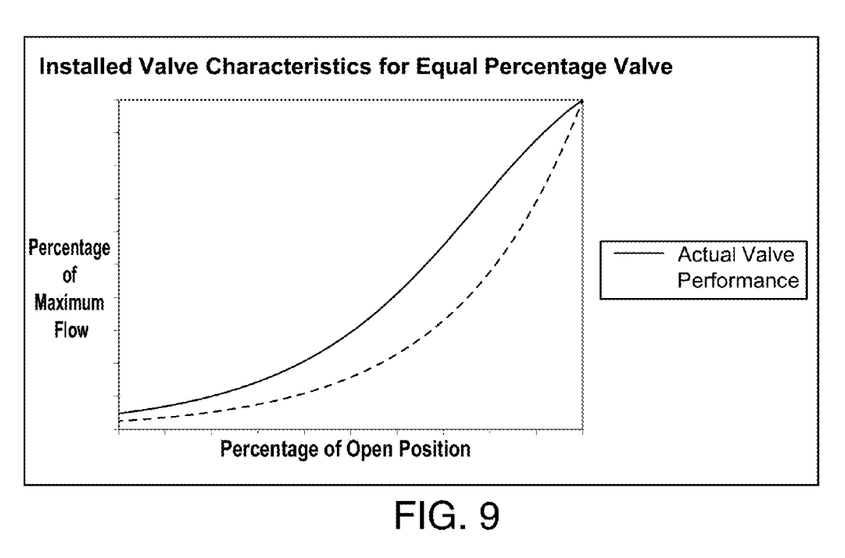

Similarly, in Table 2, which corresponds to the graph in FIG. 9, iso-curves representing the total pressure drop and maximum flow through an equal percentage valve are illustrated in the ideal and as-installed conditions.

TABLE 2

Calculate Total Pressure Drop and Max Flow Through Valve

| | |
|---|---|
| R ($\alpha$) | 40 |
| $C_v$_max | 30 |
| $\Delta P_v$ (psi) | 10 |
| $\Delta P_o$ (psi) | 20.8 |
| $f_{max}$ (gpm) | 71.13 |

In both conditions shown in FIGS. 8 and 9, the selection of a particular corresponding iso-curve, as previously discussed, involves the selection of constants based on the particular piping system requirements. Accordingly, relative to Table 1, the flow constant $K_{CL}$, specific gravity Sg, and flow are selected for a given pressure difference. Similarly, relative to Table 2, the flow constant R(a), flow coefficient C, and pressure difference $\Delta P_v$ are selected for the particular piping system.

Figure 10:
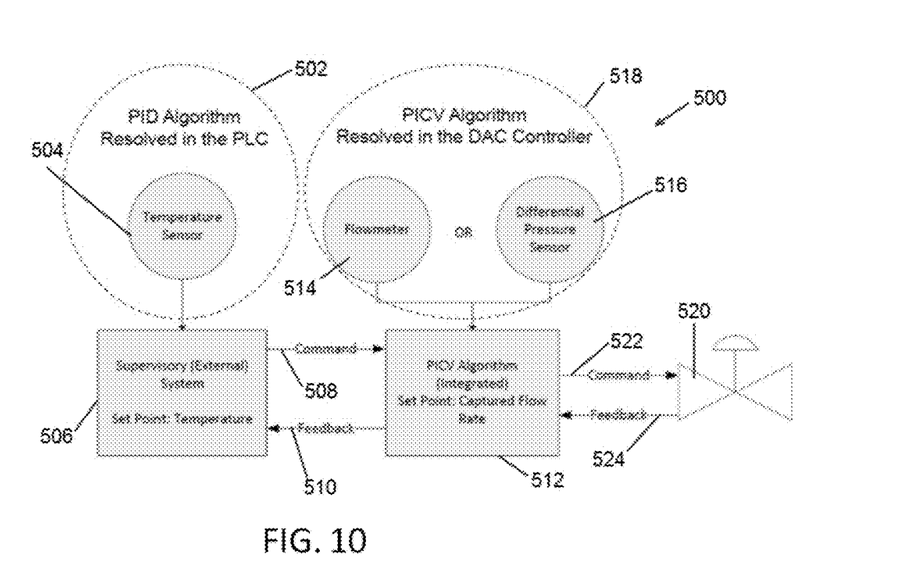
FIG. 10 is a block diagram for a control scheme using two controllers in accordance with the disclosure.

A block diagram for a system 500 using two controllers is shown in FIG. 10. In this system, a programmable logic controller (PLC) 502 operating a proportional, integral and derivative term (PID) control strategy based on a signal from a temperature sensor 504 monitoring flow temperature, exchanges information with a supervisory system controller 506. The system controller 506 exchanges commands 508 and receives feedback 510 from a pressure-independent control valve (PICV) algorithm controller 512, which operates on a flow set-point, as previously described. Operation of the PICV algorithm controller 512 may be carried out using a flow meter 514 and/or a differential pressure sensor 516 as described above, which provide signals to a flow estimation module 518. The PICV algorithm controller 512 can thus control a flow-control valve 520 in a closed loop fashion by sending commands 522 and receiving feedback therefrom.

Figure 11:
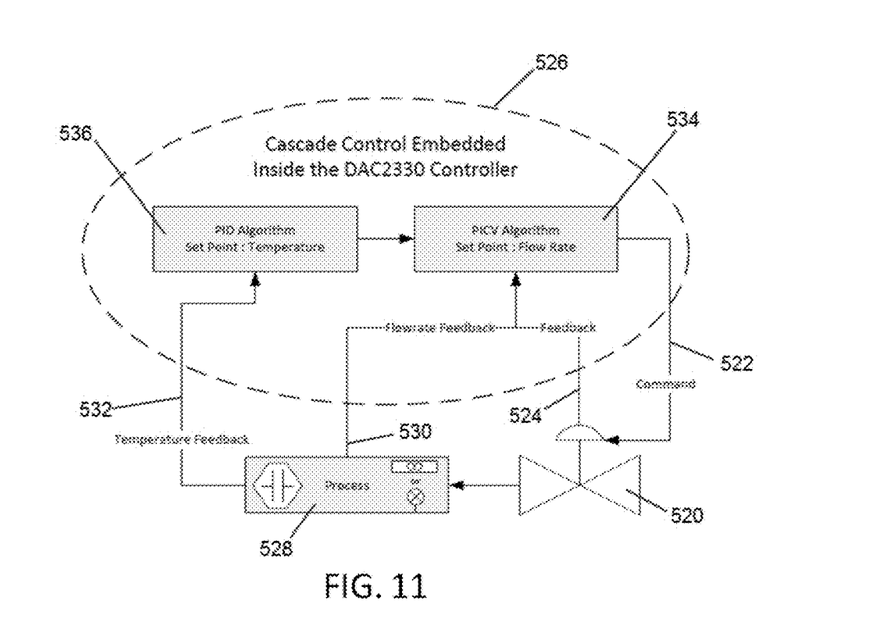
FIG. 11 is a block diagram for a cascade control using a single controller in accordance with the disclosure.

In an alternative embodiment, a standalone controller 526 may be used, as shown in the block diagram of FIG. 11. In this embodiment, a process controller 528 provides a flow rate feedback (control) signal 530 and a temperature feedback (control) signal 532, respectively, to a PICV algorithm 534 and to a PID control strategy 536 operating within the standalone controller 526. The standalone controller 526, as previously described, sends commands 522 and receives feedback 524 to/from the control valve 520.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method for operating a flow-control valve within a fluid system, comprising:

computing a plurality of original iso-curves in non-transitory computer media associated with an electronic controller, each of the plurality of original iso-curves containing information correlating a valve position with a flow through the flow-control valve;

translating an external control signal provided to the electronic controller to a desired flow rate based on one of the plurality of original iso-curves, the external control signal being indicative of a parameter setpoint other than a desired flow rate setpoint, and selecting one of the plurality of original iso-curves as an original iso-curve;

automatically establishing a flow rate set point based the desired flow rate, the flow rate set point being sufficient to satisfy the parameter setpoint;

providing a command signal to the flow-control valve to effect a change in position of the flow-control valve to achieve the flow rate setpoint independently of changes in pressure across the flow-control valve;

monitoring the flow through the flow control valve and the external control signal for changes;

adjusting the command signal, in real time, as necessary, based on the original iso-curve, to preserve the flow through the control valve;

re-calibrating the original iso-curve at periodic intervals by replacing the original iso-curve with an updated iso-curve belonging to the plurality of original iso-curves, the re-calibration being carried out when a then-present actual flow through the flow-control valve falls outside of a predetermined threshold relative to the desired flow indicating a disturbance in the process;

wherein the re-calibration is performed by the electronic controller based on a valve flow coefficient and other constants, which are determined in the electronic controller based at least in part on a valve flow signal indicative of the then-present actual flow through the flow-control valve that is received by the electronic controller.

2. The method of claim 1, wherein the actual flow is expressed by the following algebraic expression in the electronic controller:

$$Q=Cv*f(x)*\mathrm{Sqrt}(DP/SG)$$

where Q represents the actual flow, Cv represents a valve flow coefficient, $f(x)$ is a function expressed as $f(x)=R^{\wedge}(x-1)$, where and $x \in [0; 1]$ and where x represents a percentage opening position of the flow-control valve, DP represents a fluid pressure drop across the flow-control valve, and SG represents a specific gravity of fluid passing through the flow-control valve.

3. The method of claim 1, wherein the actual flow, under the assumption that a pressure drop across the flow-control valve is constant across a valve travel, is expressed by the following algebraic expression in the electronic controller:

$$Q=k(Cv,f(x))$$

where Q represents the actual flow, Cv represents a valve flow coefficient, $f(x)$ is a function expressed as $f(x)=R^{\wedge}(x-1)$, where and $x \in [0; 1]$ and where x represents a percentage opening position of the flow-control valve, and where k is a positive constant.

4. The method of claim 3, wherein a percentage change (% Gain) in flow rate through the flow-control valve resulting from a change in the controller signal is expressed by the algebraic expression:

$$\% \text{ Gain}=((f(x2)-f(x1))*kCv)/f(x1)*kCv$$

where x1 represents a flow-control valve position under the original iso-curve, and x2 represents a flow-control valve position under the new iso-curve, such that $$\% \text{ Gain}=(f(x2)-f(x1))/f(x1).$$

5. The method of claim 1, wherein the step of re-calibrating the system at periodic intervals is carried out by the electronic controller at least one of during each system startup, when the external control signal is above an upper limit, and when the external control signal is below a lower limit.

6. The method of claim 1, wherein the then-present actual flow through the flow-control valve that is received by the electronic controller is provided by a flow-metering device disposed downstream of a flow-straightening device, both of which are disposed in-line with the flow-control valve, or based on a pressure differential across the flow-control valve.

7. The method of claim 1, wherein providing the command signal to the flow-control valve to effect the change in position of the flow-control valve to achieve the desired position includes providing a signal to an actuator associated with the flow-control valve, which actuator is configured to change a position of the flow-control valve in response to the command signal.

8. The method of claim 7, wherein the actuator is a stepper motor and wherein the electronic controller is further configured to estimate a position of the flow-control valve based on the command signal.

9. A method for controlling a flow of fluid through a pipe using an electronic controller and a valve responsive to a command signal from the electronic controller, the method comprising:

receiving a desired valve position command signal at the electronic controller, the desired position command signal being indicative of a desired set point based on a control variable of the fluid within the pipe;

receiving a desired flow command signal at the electronic controller, the desired flow command signal being indicative of a desired flow rate of the fluid within the pipe and provided by a central controller;

determining a desired valve opening position of the valve in the electronic controller based on the desired flow command signal using an original iso-curve correlating valve opening to valve flow parameters;

generating a valve command signal based on the desired valve opening position, when the desired valve opening position is less or equal to the maximum desired valve opening position, in the electronic controller, and sending the command signal to the valve to effect an opening of the valve to the desired valve opening position;

acquiring a signal indicative of actual flow through the valve with the electronic controller using a fluid flow sensor associated with the pipe and configured to provide a flow signal to the electronic controller;

comparing the actual valve flow through the valve with the desired flow rate based on the flow signal and, when a difference between the actual valve flow and the desired flow rate exceeds a threshold, calculating a new iso-curve for the valve, storing the new iso-curve in the electronic controller to replace the original iso-curve, and using the new iso-curve to determine future values for the desired valve opening position, wherein calculating the new iso-curve is performed by the electronic controller based on a valve flow coefficient, which is determined in the electronic controller based at least in part on the flow signal.

10. The method of claim 9, further comprising comparing the desired valve opening position with a maximum desired valve opening position in the electronic controller.

11. The method of claim 10, further comprising generating a user notification when the desired valve opening position is within a predetermined band of the maximum desired valve opening.

12. The method of claim 9, wherein the iso-curve follows the following algebraic expression in the electronic controller:

$$Q=Cv*f(x)*\mathrm{Sqrt}(DP/SG)$$

where Q represents the actual flow, Cv represents a valve flow coefficient, $f(x)$ is a function expressed as $f(x)=R^{\wedge}(x-1)$, where and $x \in [0; 1]$ and where x represents a percentage opening position of the flow-control valve, DP represents a fluid pressure drop across the flow-control valve, and SG represents a specific gravity of fluid passing through the flow-control valve.

13. The method of claim 9, wherein the actual flow, under the assumption that a pressure drop across the valve is constant across a valve travel, is expressed by the following algebraic expression in the electronic controller:

$$Q=k(Cv,f(x))$$

where Q represents the actual flow, Cv represents a valve flow coefficient, f(x) is a function expressed as $f(x)=R\char`\^(x-1)$, where and $x \in [0; 1]$ and represents a percentage opening position of the valve, and where k is a positive constant.

14. The method of claim 13, wherein a percentage change (% Gain) in flow rate through the valve resulting from a change in the controller signal is expressed by the algebraic expression:

$$\% \text{ Gain} = ((f(x2)-f(x1))*kCv)/f(x1)kCv$$

where x1 represents a flow-control valve position under the original iso-curve, and x2 represents a flow-control valve position under the new iso-curve, such that $$\% \text{ Gain} = (f(x2)-f(x1))/f(x1).$$

15. The method of claim 9, wherein the step of calculating the new iso-curve occurs at periodic intervals, including each time the electronic controller is started.

16. The method of claim 9, wherein the actual flow through the valve that is received by the electronic controller is provided by the fluid flow sensor that is disposed downstream of a flow-straightening device, both of which are disposed in-line with the valve along the pipe.

17. The method of claim 9, wherein providing the command signal to the valve includes providing a signal to an actuator associated with the valve, which actuator is configured to change a position of the valve in response to the command signal.

18. The method of claim 17, wherein the actuator is a stepper motor and wherein the electronic controller is further configured to estimate a position of the valve based on the command signal.

19. A method for controlling a temperature of a flow of a mixture of fluids at different temperatures in a pipe, the method comprising:
receiving a desired temperature command signal and a current fluid temperature of the fluid mixture flowing in the pipe in an electronic controller;
capturing a desired flow rate for a first fluid of the fluid mixture as a flow setpoint, the flow setpoint corresponding to the desired temperature command signal;
when a command signal change is received at the electronic controller, determining a new valve flow corresponding to a new desired temperature command, the new valve flow representing a valve flow controlling the flow of the first fluid versus a valve position transfer function;
determining a new flow setpoint for the first fluid based on the command signal change;
comparing the new flow setpoint to a maximum flow rate;
changing a flow rate command to the valve for the first fluid based on the new flow setpoint;
wherein the new valve flow calibration is related to a previous command in the electronic controller in accordance with the following expression:

$$(Q'\_\text{Req}) = (Q\_\text{Req})*((f(x2)-f(x1)*kCv)/f(x1)*kCv$$

where k is a positive constant, Cv is a valve flow coefficient, $f(x)=R\char`\^(x-1)$, and $x \in [0; 1]$.

20. The method of claim 19, further comprising verifying whether the current temperature is within a predetermined difference with respect to the desired temperature command signal.

* * * * *